(12) United States Patent
Chitturi

(10) Patent No.: US 7,746,847 B2
(45) Date of Patent: Jun. 29, 2010

(54) JITTER BUFFER MANAGEMENT IN A PACKET-BASED NETWORK

(75) Inventor: Suresh Babu Chitturi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1317 days.

(21) Appl. No.: 11/231,233

(22) Filed: Sep. 20, 2005

(65) Prior Publication Data

US 2007/0064679 A1 Mar. 22, 2007

(51) Int. Cl.
H04L 12/66 (2006.01)
(52) U.S. Cl. .................. 370/352; 370/516; 370/356; 370/401; 370/252
(58) Field of Classification Search .............. 370/352, 370/356, 401, 252, 516; 379/503–519
See application file for complete search history.

(56) References Cited

U.S. PATENT DOCUMENTS

| 6,259,677 | B1 * | 7/2001 | Jain ............................ 370/252 |
| 6,452,950 | B1 * | 9/2002 | Ohlsson et al. ............. 370/516 |
| 6,658,027 | B1 | 12/2003 | Kramer et al. |
| 7,027,456 | B1 * | 4/2006 | Chen ........................... 370/412 |
| 7,233,605 | B1 * | 6/2007 | Oran ........................... 370/526 |
| 7,346,005 | B1 * | 3/2008 | Dowdal ....................... 370/252 |
| 7,496,086 | B2 * | 2/2009 | Eckberg ...................... 370/352 |
| 2003/0091047 | A1 * | 5/2003 | Pate et al. .................... 370/392 |
| 2003/0112758 | A1 * | 6/2003 | Pang et al. ................... 370/235 |
| 2005/0232309 | A1 * | 10/2005 | Kavaler ....................... 370/519 |
| 2006/0034338 | A1 * | 2/2006 | Degenhardt et al. ........ 370/516 |
| 2006/0056383 | A1 * | 3/2006 | Black et al. ................. 370/350 |
| 2007/0223467 | A1 * | 9/2007 | Makiuchi et al. ............ 370/363 |
| 2008/0151765 | A1 * | 6/2008 | Cheruvathery ............. 370/252 |

OTHER PUBLICATIONS

"Intel NetStructure IPT1200C, IPT2400C, IPT4800C, IPT6720C, and IPT10000C Boards", (Nov. 2004), 7 pgs.
"Intel Voice over IP Reference Design: High-Density Subsystem Board for Carrier Voice over Packet Gateways", (2001), 4 pgs.
Schulzrinne, H. , et al., "RTP Payload for DTMF Digits, Telephony Tones and Telephony Signals", (May 2000), 24 pgs.

* cited by examiner

Primary Examiner—Melanie Jagannathan
Assistant Examiner—Khaled Kassim
(74) Attorney, Agent, or Firm—John N. Greaves

(57) ABSTRACT

A method, system and computer program product for handling a session in a packed-based network is provided. The method involves the transmission of packets representing the session. A minimum and a maximum jitter delay value are set for the session. The minimum jitter delay value is based on the time taken by a tone detection algorithm to detect the end of a DTMF event and the maximum jitter delay value is based on the network delay the first packet has been subjected to. The transmitted packets are buffered in a jitter buffer, based on a pre-defined criterion. The packets are played out of the jitter buffer, based on the minimum and maximum jitter delay values.

18 Claims, 7 Drawing Sheets

| Packet | Timestamp | Duration (ms) | Marker-bit value | End-bit value |
|---|---|---|---|---|
| 1 | T | 5 | 1 | 0 |
| 2 | T | 5+5 | 0 | 0 |
| 3 | T | 10+5 | 0 | 0 |
| 4 | T | 15+5 | 0 | 0 |
| --- | --- | --- | --- | --- |
| --- | --- | --- | --- | --- |
| 99 | T | 490+5 | 0 | 0 |
| 100 | T | 495+5 | 0 | 0 |
| 101 | T | 500 | 0 | 0 |
| 102 | T | 500 | 0 | 0 |
| 103 | T | 500 | 0 | 0 |
| 104 | T | 500 | 0 | 0 |
| 105 | T | 500 | 0 | 1 |

FIG. 3

JITTER BUFFER MANAGEMENT IN A PACKET-BASED NETWORK

BACKGROUND

Various embodiments of the present invention relate to the field of packet-based networks. In particular, the embodiments relate to methods, systems, and computer program products for handling sessions in a packet-based network.

With the increasing use of high-performance programmable processors in media gateways, Voice-over-Internet-Protocol (VoIP) systems, Voice-over Packet Network (VoPN) systems, and packet-based networks have adopted a modular approach. These programmable processors perform functions such as voice processing, event handling, and packetization. VoIP defines a way of handling voice calls and events over a packet-based network. A VoIP transmitter transmits these voice calls or events as packets over the packet-based network. Further, the packets are transmitted at a constant rate. The packets follow different paths on the packet-based network, and therefore, are subjected to different delays and might not reach a VoIP receiver at a constant rate. The delay in arrival of the packets to the VoIP receiver is referred to as a jitter delay. A jitter buffer in the VoIP receiver stores these packets taking into account the jitter delay so that the packets are played out at a constant rate.

Conventional VoIP systems, working in accordance with the Request for Comments (RFC) 2833 standard (RTP Payload for DTMF Digits, Telephony Tones and Telephony Signals, May 2000), transmit packets that represent a Dual-tone Multi-frequency (DTMF) event with the same timestamp. Further, the duration of these packets is incremented as long as the DTMF event continues. Examples of DTMF events include pressing digits 0-9, *, #, ring tones, busy tones, and the like. The last packet of the DTMF event has an end-bit value as one, to communicate to the VoIP receiver that the DTMF event has ended. The VoIP transmitter detects the end of the DTMF event by executing a tone-detection algorithm, which takes in the range of 20-30 milliseconds (ms) to detect the end of an event. During this period, the transmitter does not transmit any packet. However, if the jitter buffer holds the packets for a period of time that is less than 20-30 ms, the VoIP receiver may not receive the packet with the end-bit value as one. In this case, the VoIP receiver may consider that the packet with the end-bit value as one is lost, and extend the DTMF event beyond its actual duration. Moreover, if a new DTMF event starts during this period of 20-30 ms, the two DTMF events may get merged, and if the two DTMF events are the same, then the play out will look as if a single DTMF event has been transmitted.

BRIEF DESCRIPTION OF THE DRAWINGS

The various embodiments of the invention will hereinafter be described in conjunction with the appended drawings, provided to illustrate and not to limit the invention, wherein like designations denote like elements, and in which:

FIG. 3 illustrates a table representing the transmission of packets representing an exemplary DTMF event, in accordance with an embodiment of the invention;

DESCRIPTION OF VARIOUS EMBODIMENTS

Various embodiments of the invention provide a method, a system, and a computer program product for handling a session in a packet-based network. The session includes one or more of a voice event and a DTMF event. The voice event and DTMF event are transmitted as packets. Further, the packets may include one or more frames. The frames include the data of the voice events and the DTMF events. The voice event and the DTMF event will be hereinafter referred to as an event. The session in the packet-based network is handled by setting a minimum jitter delay value and a maximum jitter delay value. The packets are inserted into a jitter buffer, based on a pre-defined criterion. These packets are played out of the jitter buffer, based on the minimum jitter delay value and the maximum jitter delay value.

Figure 1:
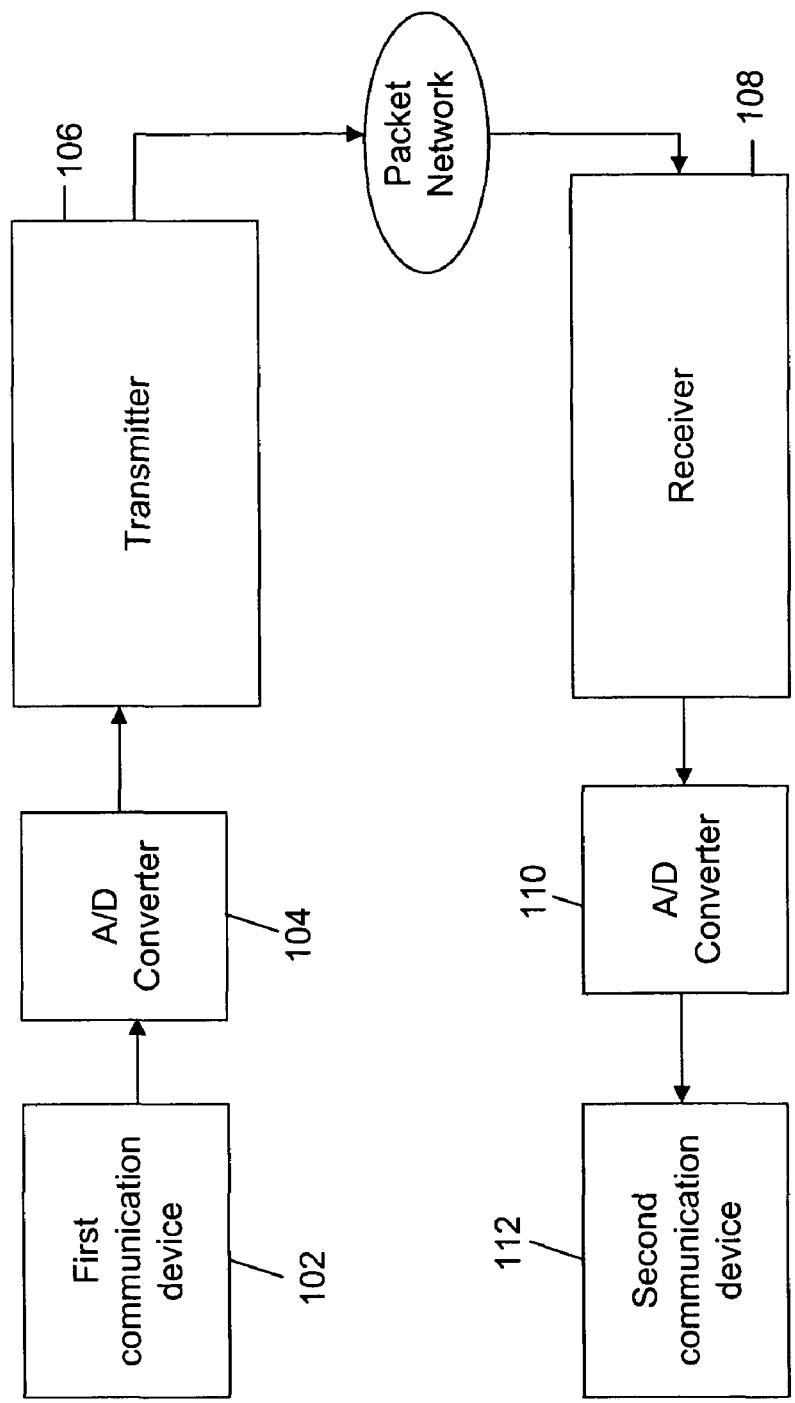
FIG. 1 is a block diagram of a VoIP system in which various embodiments of the invention may be practiced.

FIG. 1 is a block diagram of a VoIP system 100 in which various embodiments of the invention may be practiced. VoIP system 100 includes a first communication device 102, an Analog-to-Digital converter (A/D converter) 104, a transmitter 106, a receiver 108, a Digital-to-Analog converter (D/A converter) 110, and a second communication device 112. In an embodiment of the invention, VoIP system 100 is a frame based system. In a frame-based system, packets representing the session are transmitted at every frame period.

First communication device 102 makes a VoIP call to second communication device 112. The VoIP call is also referred to as a session. First communication device 102 is connected to A/D converter 104. A/D converter 104 digitizes an event, which is an analog signal, into at least one frame. Transmitter 106 packetizes these frames into at least one packet. Further, transmitter 106 transmits the packets over the packet based network, hereinafter referred to as an IP network. In an embodiment of the invention, transmitter 106 transmits packets representing a DTMF event with same duration during a time period in which end of the DTMF event is detected.

While traversing the IP network, each packet transmitted by transmitter 106 may be subjected to a different delay, also referred to as jitter delay. Therefore, the packets may not arrive at receiver 108 in the order in which they are transmitted. The delay a packet has been subjected to is also referred to as a network delay. Receiver 108 stores these packets and arranges them in the order in which the packets are transmitted. In an embodiment of the invention, receiver 108 stores the packets based on a minimum jitter delay value and maximum jitter delay value. The packets are de-packetized into the frames and played out of receiver 108. D/A converter 110 converts these frames into the analog signal, which is received by second communication device 112.

In the VoIP system 100, first communication device 102 and second communication device 112 may be, for example, analog telephones with a VoIP adapter, digital phones, Ethernet phones, Internet protocol phones, cable modems, data modems, Private Branch Exchange (PBX) or Interactive Voice Response (IVR) systems, and so forth. In an embodiment of the invention, A/D converter 104 and D/A converter 110 may be integrated in first communication device 102 and second communication device 112, respectively.

Transmitter 106 and receiver 108 may be a media gateway with a digital signal processor (DSP) and a network processor or a packet processor.

Figure 2:
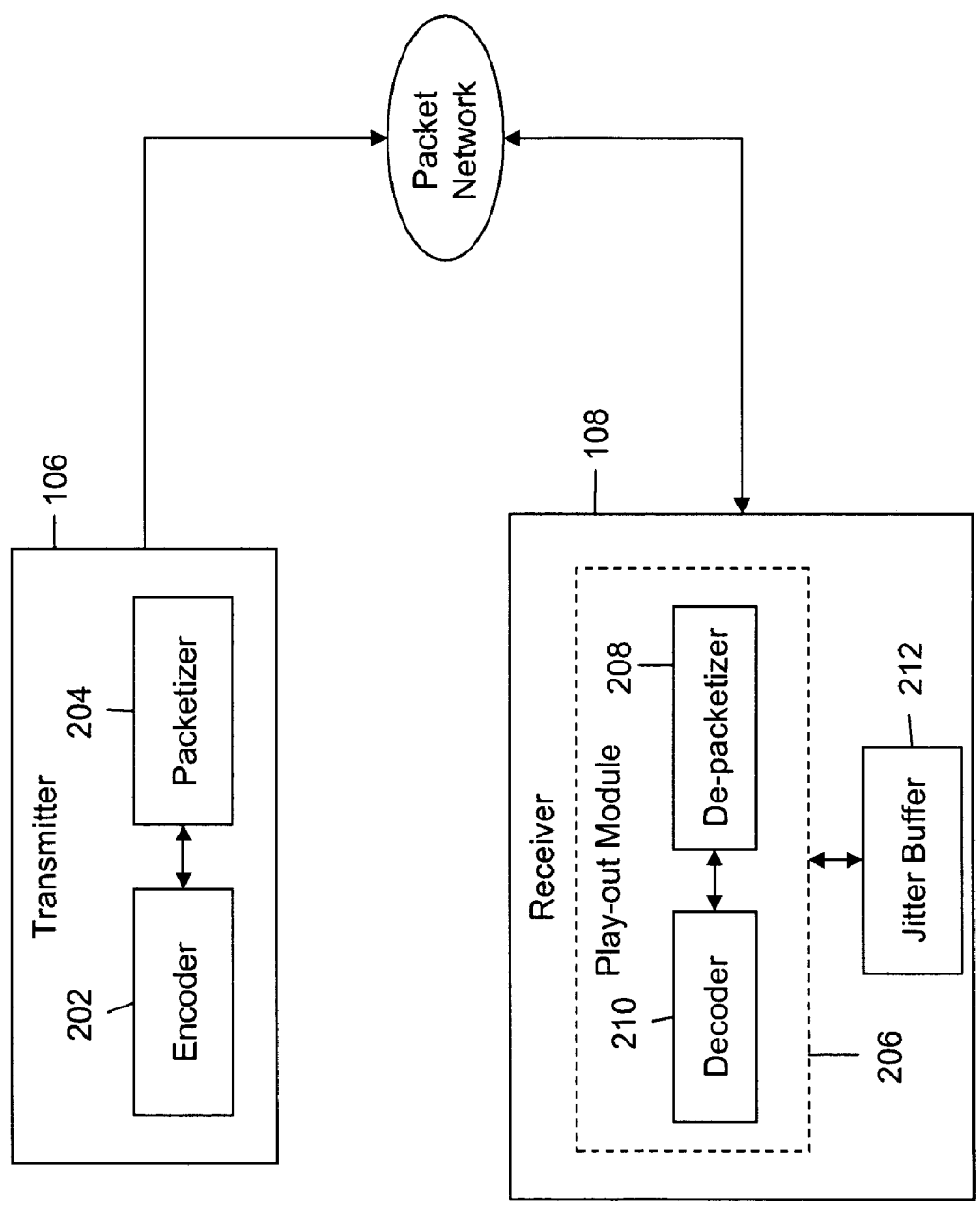
FIG. 2 is a block diagram of a transmitter and receiver of the VoIP system, in accordance with an embodiment of the invention.

FIG. 2 is a block diagram of transmitter 106 and receiver 108 of VoIP system 100 in accordance with an embodiment of the invention. Transmitter 106 includes an encoder 202 and a packetizer 204. Receiver 108 includes a play-out module 206 and a jitter buffer 212. Play-out module 206 includes a de-packetizer 208 and a decoder 210. Each frame of an event is encoded by encoder 202 into an encoded frame. Transmitter 106 uses a standard codec to encode the frames. Transmitter 106 transmits the packets in the IP network every frame period. Packetizer 204 packetizes encoded frames into at least one packet. Packetization involves adding Real Transport Protocol (RTP)/User Datagram Protocol (UDP) and Internet Protocol (IP) headers to each of the encoded frames. RTP is specified in Internet Engineering Task Force (IETF) Request for Comments (RFC) 1889 (RTP Payload for DTMF Digits, Telephony Tones And Telephony Signals, January 1996) and is designed by the IETF's Audio-Video Transport (AVT) working group to support video conferences with multiple, geographically dispersed participants. Further, UDP is a minimal message-oriented transport layer protocol that is documented in IETF, RFC 768 (Request for Comments, August 1980).

Packetizer 204 assigns a timestamp and specifies the duration of each packet. As per RFC 2833 standard (RTP Payload for DTMF Digits, Telephony Tones and Telephony Signals, May 2000) recommendations, for packets representing a DTMF event, packetizer 204 assigns the same timestamp to the packets, and increments the duration of the packets as long as the DTMF event continues. The timestamp represents the starting time of the packet representing the event. The duration of the packet depends on the codec used by transmitter 106.

Transmitter 106 sends a silence period indication packet when no event is being generated by first communication device 102. Further, transmitter 106 detects an end of the event by executing a tone-detection algorithm. In an embodiment of the invention, transmitter 106 transmits each packet, representing a DTMF event, with the same duration while the tone-detection algorithm is detecting the end of the DTMF event (This is explained in detail in conjunction with FIG. 3.). Receiver 108 receives the packets transmitted by transmitter 106 and sets a minimum jitter delay value and a maximum jitter delay value for a session on receiving a first packet of the session.

De-packetizer 208 de-packetizes each packet into the encoded frames. Each encoded frame is buffered in jitter buffer 212, to reorganize the encoded frames in the order in which the encoded frames are transmitted. Play-out module 108 inserts these encoded frames into jitter buffer 212, based on a pre-defined criterion. In an embodiment of the invention, the pre-defined criterion is based on network delay. (The pre-defined criterion is explained in detail in conjunction with FIG. 5A.) In an embodiment of the invention, the functionality of jitter buffer 212 is divided into a packet-receive function and a packet-request function. The packet-receive function handles and buffers the packets transmitted by transmitter 106 in jitter buffer 212. The packet-request function handles the requests for packets send by decoder 210. (The packet-receive function and packet-request function have been further illustrated in conjunction with FIG. 5A, FIG. 5B and FIG. 6, respectively.) Play-out module 206 plays out the encoded frames stored in jitter buffer 212, based on a minimum jitter delay value and a maximum jitter delay value. Decoder 210 decodes the encoded frames. The decoded frames are converted into the analog signal by D/A converter 110.

In an embodiment of the invention, encoder 202 and decoder 210 may be a Digital Signal Processor (DSP). Encoder 202 and decoder 210 may use encoding standards such as the G. 711, G.729, G. 723, Adaptive Multi-Rate (AMR), Enhanced Variable Rate Coder (EVRC) codecs. G. 711 is an International Telecommunication Union (ITU) Telecommunication Standardized Sector (ITU-T) standard for audio companding. G.729 is an audio data compression algorithm for voice that compresses voice audio in chunks of 10 milliseconds. G.723 is an ITU standard for voice codecs. Adaptive Multi-Rate (AMR) is an audio data compression scheme optimized for speech coding. EVRC, a speech codec used by CDMA networks, was developed in 1995.

For example, if a G. 711 standard codec, having a frame size of 5 ms is used by transmitter 106, and each packet comprises a frame, the duration of each packet will be 5 ms. Further, the packets are transmitted every 5 ms. In an embodiment of the invention, a packet may include two or more frames. If the packet includes two 5 ms frames, the duration of the packet will be 10 ms and the packets are transmitted every 10 ms. Further, RFC 2833 standard recommendations specify that the duration of each packet, representing a DTMF event, is represented as a cumulative duration value, i.e., if a first packet and a second packet have a duration of 5 ms, the duration of the second packet is represented as 10 ms (5 ms of the first packet+5 ms of the second packet). This is further explained in detail in conjunction with FIG. 3. Further, for packets representing a voice event, the timestamp is incremented as long as the voice event continues, and the duration of the packets is kept constant.

Packetizer 204 and de-packetizer 208 may be a network processor or a packet processor. In various embodiments of the invention, jitter buffer 212 is a memory. In an embodiment of the invention, the memory is a volatile memory such as Static Random Access Memory (SRAM), Synchronous Dynamic Random Access Memory (SDRAM), or a combination thereof. In an embodiment of the invention, the size of jitter buffer 212 may be controlled by the network processor or the packet processor.

FIG. 3 illustrates a table representing the transmission of packets representing an exemplary DTMF event, in accordance with an embodiment of the invention. Transmitter 106, based on the G. 711 standard codec, transmits the exemplary DTMF event. The G. 711 standard codec has a frame size of 5 ms. The exemplary DTMF event has a total duration of 500 ms. Packets have been shown without RTP/UDP and IP headers to aid understanding. Further, for the DTMF event, the table provides details, such as, timestamp, duration representation, a marker-bit value and an end-bit value of each packet. A marker-bit value of one indicates the start of a new event. The end-bit value of one signifies the end of the event. For example, for a first packet, the timestamp is T, the duration representation is 5 ms, the marker-bit value is one and the end-bit value is zero. A duration representation of 5 ms for the first packet signifies that the first packet contains 5 ms of data of the exemplary DTMF event. Similarly, a second packet also contains 5 ms of data. Therefore, the duration of the second packet is incremented by 5 ms. Hence, the duration representation of the second packet is 10 ms (5 ms of the first packet+5 ms of the second packet). Packets are transmitted in a similar manner till 500 ms. Therefore, the duration of the $100^{th}$ packet is 5 ms and its duration representation is 500 ms. After the $100^{th}$ packet is transmitted by transmitter 106, a tone-detection algorithm starts to detect the end of the exemplary DTMF event. During this time period, packetizer 204 assigns the same duration representation to all the packets. For example, if the tone-detection algorithm takes 25 ms to detect the end of the exemplary DTMF event, packetizer 204 generates five packets (packet 101 to packet 105) with the same duration representation, 500 ms, as that of the $100^{th}$ packet. This indicates that the exemplary DTMF event is continuing, and therefore, receiver 108 waits till the packet with an end-bit value as one is received. When the tone-detection algorithm detects the end of the exemplary DTMF event, packetizer 204 assigns the value of one to the end-bit value of the $105^{th}$ packet, signifying that it is the last packet of the exemplary DTMF event, and the exemplary DTMF event ends.

In various embodiments of the invention, the time taken by the tone detection algorithm is more than a frame time period. This is because DTMF events, for example a tone, may have gaps. In one embodiment of the invention, the duration of the gaps in the tone may be in the range of 5 ms to 50 ms. If the tone detection algorithm takes one frame time period, for example 5 ms, to detect the end of the tone, the tone will detect the gap as an end of the DTMF event. Hence, the tone may be represented as two or more DTMF events. Hence, in order to determine the actual end of a DTMF event, the time taken by the tone detection algorithm is greater than the frame time period (size). In one embodiment of the invention, the time taken by the tone detection algorithm is in the range of 25 ms to 30 ms.

Figure 4:
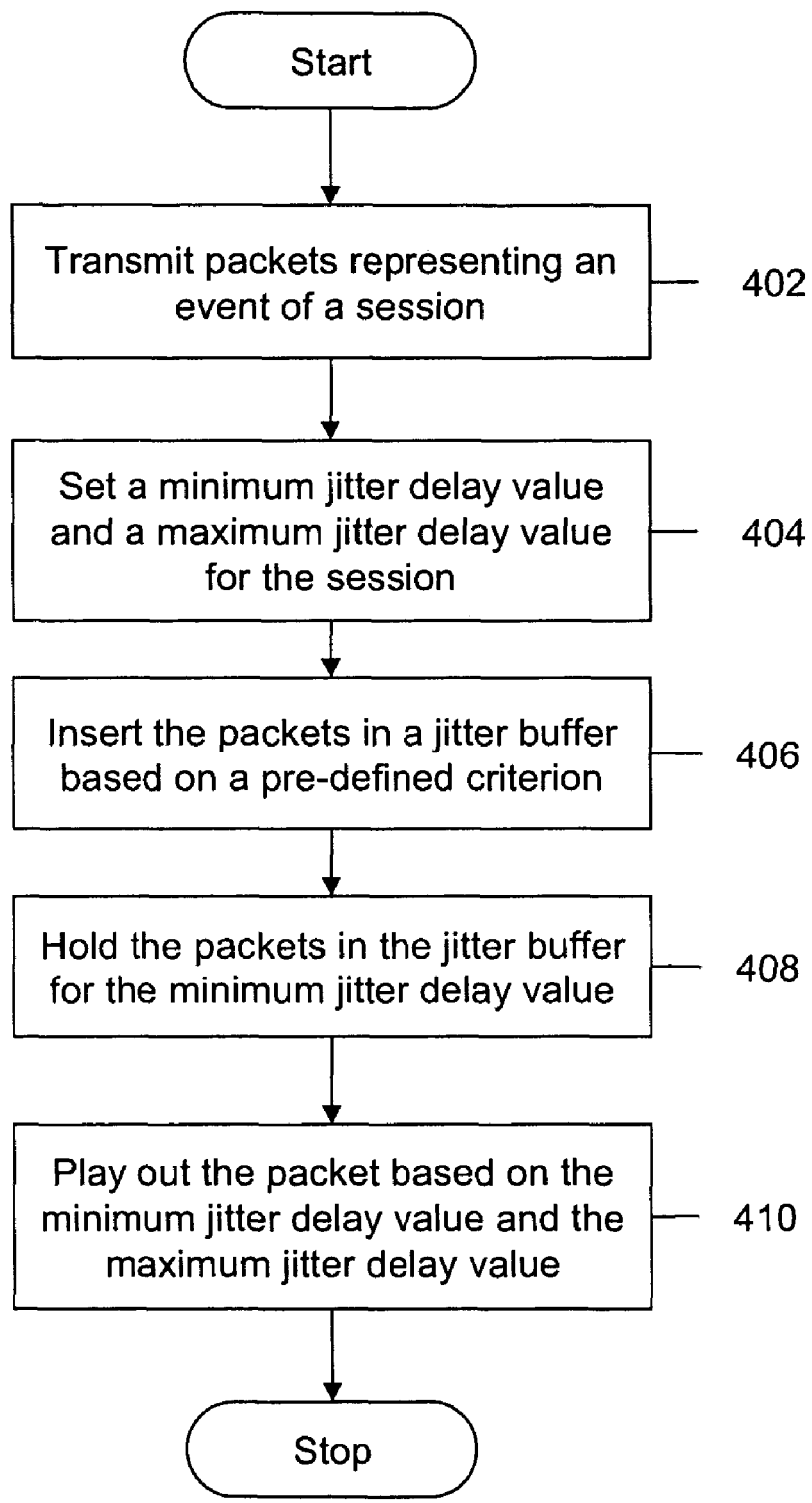
FIG. 4 is a flowchart of a method for handling a session in a packet-based network, in accordance with an embodiment of the invention.

FIG. 4 is a flowchart of a method for handling a session in a packet-based network 100, in accordance with an embodiment of the invention. At 402, the session is transmitted in the form of packets. At 404, a minimum jitter delay value and a maximum jitter delay value are set for the session. The minimum jitter delay value is the minimum time for which a packet is stored in a jitter buffer before the packet is played out. The maximum jitter delay value is the maximum time for which the packet may be stored in the jitter buffer. In an embodiment of the invention, the minimum jitter delay value is based on the time taken by the tone-detection algorithm to detect the end of a DTMF event. The maximum jitter delay value is based on the network delay experienced by the first packet representing a voice event. At 406, the packets are inserted into the jitter buffer, based on a pre-defined criterion. In an embodiment of the invention, the pre-defined criterion includes a network delay condition, which includes a prefill condition. The network delay condition also includes a check in which for a packet representing a voice event, it is checked whether the sum of the timestamp of the packet and its frame size is greater than a first desired timestamp value. The network delay condition further includes a check in which for a packet representing a DTMF event, it is checked, whether the sum of the timestamp of the packet and its duration is greater than a second desired timestamp value. Further, the pre-defined criterion also includes a check in which it is checked if a packet, representing a DTMF event with an end-bit value as one, is received and the DTMF event is active. (This is explained in detail in conjunction with FIGS. 5A and 5B.) At 408, each packet is held in the jitter buffer for the minimum jitter delay value. Thereafter, at 410, the packets are played out of the jitter buffer, based on the minimum and maximum jitter delay values.

Figure 5A:
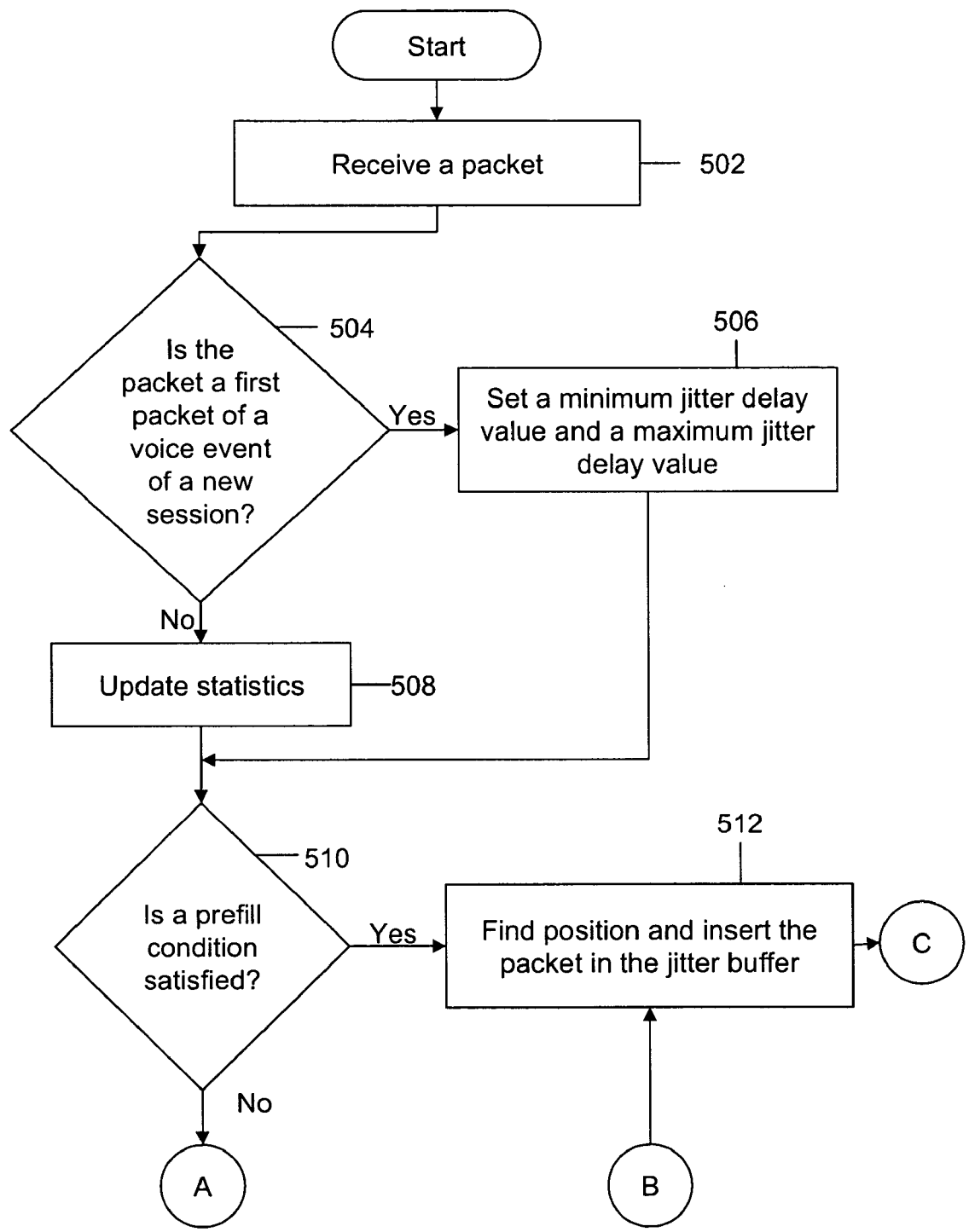
FIGS. 5A and 5B is a flowchart illustrating a packet-receive function of a jitter buffer, in accordance with an embodiment of the invention.
Figure 5B:
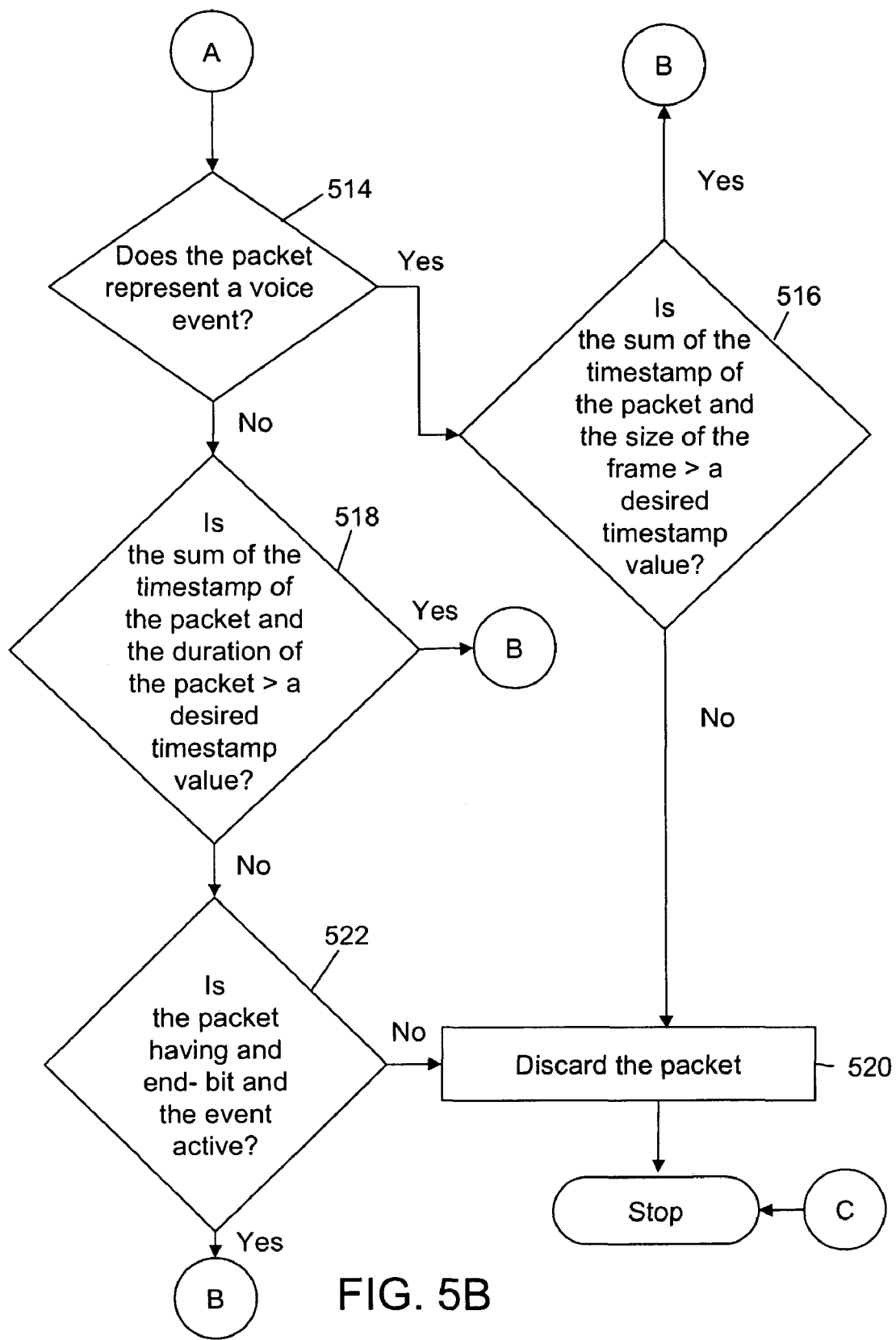

FIGS. 5A and 5B are flowcharts illustrating a packet-receive function of a jitter buffer, in accordance with an embodiment of the invention. At 502, a packet representing a session is received. At 504, a check is carried out if the packet is the first packet of a voice event in a new session. A new session refers to a new call between two communication devices. If the packet is the first packet of the voice event of the new session, minimum and maximum jitter delay values are set at 506. Minimum jitter delay value is set based on the time taken by a tone detection algorithm to detect the end of a DTMF event. Maximum jitter delay value is set based on the size of a jitter buffer. In an embodiment of the invention, the minimum jitter delay value and maximum jitter delay value may be based on historical data related to network delays. If the packet is not the first packet of the voice event of the new session, statistics for the session in progress are updated at 508. In an embodiment of the invention, statistics refer to the statistics of a session, defined in the RFC 1889 standard. These statistics may include the total number of packets received, the initial sequence number received, the inter-arrival jitter, the number of packets expected, and the cumulative number of packets lost. The statistics are updated whenever a packet is received. At 510, a prefill condition is checked. The prefill condition is a state when none of the packets stored in the jitter buffer are being played out of the jitter buffer, and none of the packets have met the network delay. If the prefill condition is satisfied, the packet is inserted in the jitter buffer at 512. In an embodiment of the invention, a packet representing a voice event is inserted, based on the timestamp of the packet. In another embodiment of the invention, a packet representing a DTMF event is inserted, based on the duration of the packet.

If the prefill condition is not satisfied, at 514, it is checked whether the packet represents a voice event or a DTMF event. If the packet represents the voice event, the sum of the timestamp of the packet and the size of the frame is compared with a first desired timestamp value at 516. If the packet represents the DTMF event, the sum of the timestamp of the packet and the duration of the packet is compared with a second desired timestamp value at 518.

In an embodiment of the invention, the first desired timestamp value and the second desired timestamp value is based on the network delay. Further, the first desired timestamp value and the second desired timestamp value is updated when a packet is received. In an embodiment of the invention, the first desired timestamp value is calculated as per equation one:

$$\text{First Desired timestampvalue} = \text{Oldestpacket timestamp} + \text{Framesize} \quad (1)$$

The oldest packet timestamp refers to the timestamp of a packet stored in the jitter buffer, with a smallest timestamp value.

In another embodiment of the invention, the second desired timestamp is calculated as per equation two:

$$\text{Second Desired timestampvalue} = \text{Actual timestampvalue} + \text{Framesize} \quad (2)$$

Since all the packets representing a DTMF event are transmitted with the same timestamp, the actual timestamp value of each packet received is calculated as the sum of the timestamp of the DTMF event and the duration representation of the packet. The actual timestamp value is compared to the second desired timestamp value. In an embodiment of the invention, if the packet includes more than one frame, the sum of the timestamp of the packet and the size of the frame, multiplied by the number of frames in the packet, is compared to the second desired timestamp value.

For a packet representing the voice event, if the sum of the timestamp of the packet and the size of the frame is greater than the first desired timestamp value, the packet is inserted in the jitter buffer at 512. If the sum of the timestamp of the packet and the size of the frame is less than the first desired timestamp value, the packet is discarded at 520. For a packet representing the DTMF event, if the sum of the timestamp of the packet and the duration of the packet is greater than the second desired timestamp value, the packet is inserted in the jitter buffer at 512. If the sum of the timestamp of the packet and the duration of the packet is less than the second desired timestamp value, the end-bit value for the packet is checked at 522. Further, the jitter buffer is checked to determine whether the event is active. The event is active if any packet representing the event is present in the jitter buffer. If the end-bit value is one, and the event is active, the packet is inserted in the jitter buffer at 512. If the end-bit value is zero, the packet is discarded at 520.

In an embodiment of the invention, a packet representing a voice event may be discarded, if the sum of timestamp of the packet and the frame size is less than the sum of the first desired timestamp and the product of frame size and the length of the jitter buffer (as illustrated by equation 3).

$$\text{Timestamp+Frame Size} < \text{First Desired timestampvalue+Framesize*Jitterbuffer Length} \quad (3)$$

In an embodiment of the invention, a packet representing a DTMF event may be discarded, if the sum of timestamp of the packet and the duration of the packet is less than the sum of the second desired timestamp and the product of frame size and the length of the jitter buffer (as illustrated by equation 4). The length of the jitter buffer indicates the number of packets that can be stored by the jitter buffer.

$$\text{Timestamp+Duration} < \text{Second Desired timestampvalue+Framesize*Jitterbuffer Length} \quad (4)$$

In an embodiment of the invention, for packets representing a DTMF event, a first packet is inserted in the jitter buffer. For the subsequent packets, the duration of the first packet stored in the jitter buffer is updated, to represent the cumulative duration of the first packet and the next packet representing the DTMF event.

Figure 6:
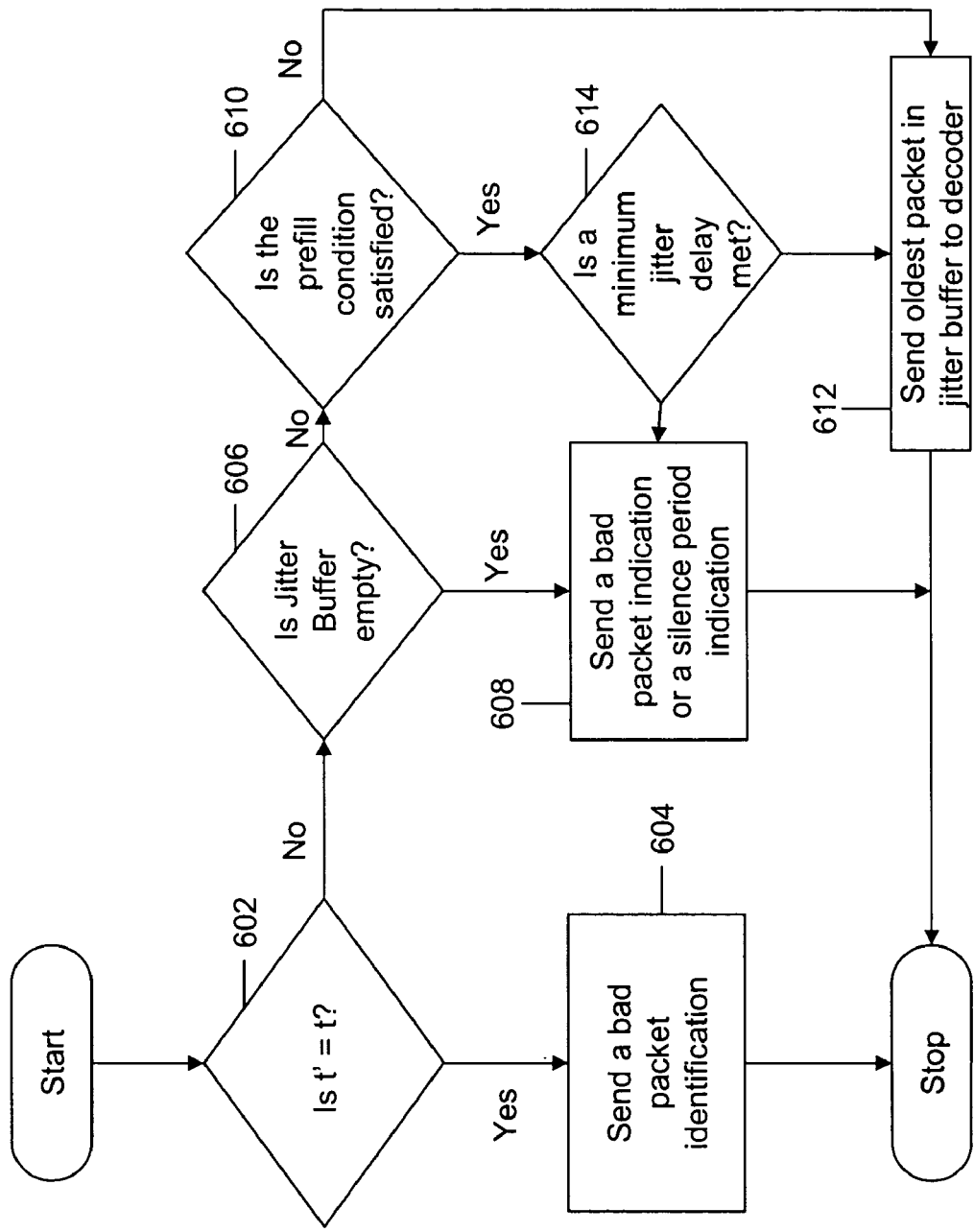
FIG. 6 is a flowchart illustrating a packet-request function of a jitter buffer, in accordance with an embodiment of the invention.

FIG. 6 is a flowchart illustrating a packet-request function of the jitter buffer, in accordance with an embodiment of the invention. On receiving a request, a timestamp t' of the requested packet, representing a DTMF event, is compared to a timestamp t of a packet with the smallest duration value, stored in the jitter buffer, at 602. If the packet represents a voice event, the timestamp t' of the requested packet is compared to the timestamp t of a packet with the smallest timestamp value. If t' is not equal to t, a bad packet indication packet is sent by the jitter buffer at 604. A bad packet indication signifies that either the requested packet has been lost while traversing the IP network or it has not yet arrived. If t' is equal to t, the jitter buffer is checked to determine if it is empty at 606. If the jitter buffer is empty, a bad packet indication or a silence period indication is send by the jitter buffer at 608. If the jitter buffer is not empty, the prefill condition is checked at 610. If the prefill condition is not satisfied, the packet representing a DTMF event, stored in the jitter buffer with the smallest duration value, is send by the jitter buffer at 612. If the packet represents a voice event, the packet with the smallest timestamp value is sent by the jitter buffer. If the prefill condition is satisfied, at 614, a check is carried out to determine if the requested packet, stored in the jitter buffer, has been kept in the jitter buffer for a period equal to a minimum jitter delay value. In an embodiment of the invention, the minimum jitter delay value is greater than the time taken by the tone-detection algorithm to detect the end of a DTMF event. If the packet has been kept in the jitter buffer for a period that is equal to the minimum jitter delay value, the packet is played out of the jitter buffer at 612. In an embodiment of the invention, if the packet represents a DTMF event, a packet with a duration that is equal to the frame size is played out of the jitter buffer. Further, the duration of the packet representing the DTMF event stored in the jitter buffer is decreased by the frame size. In another embodiment of the invention, if the duration of the packet representing the DTMF event is less than its frame size, and the end-bit value is one, the packet is played out and the DTMF event is considered to have ended. For example, if the frame size is 5 ms and the packet contains 3 ms of data of a DTMF event, then the packet played out of the jitter buffer contains 3 ms of data for the DTMF event and 2 ms of silence period indication. If the packet has not been kept in the jitter buffer for the minimum jitter delay period, a bad packet indication packet or a silence period indication packet is sent by the jitter buffer at 608.

In various embodiments of the invention, the elements of the system described above may be implemented as software logic, hardware logic, or a combination thereof.

The various embodiments of the invention provide a method and system that handle a session in a packet-based network. The session is handled by setting a minimum and a maximum jitter delay value. This ensures that the receiver waits for the packet with an end-bit value of one for a time period more than the time taken by the tone-detection algorithm to determine the end of a DTMF event. Further, the various embodiments of the invention provide methods and systems that handle a session in a packet-based network, without any change in the conventional elements of the packet-based network.

It will be apparent to a person skilled in the art that the methods according to various embodiments of the invention may be embodied in a computer program product.

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the method of the present invention.

The computer system comprises a computer, an input device, a display unit, and the Internet. The computer can incorporate a microprocessor. The microprocessor can be connected to a communication bus. The computer can also include a memory. The memory may include Random Access Memory (RAM) and/or Read Only Memory (ROM). The computer system can further incorporate a storage device. The storage device can include a hard disk drive or a removable storage drive, such as a floppy disk drive and/or an optical disk drive. Storage device can also be other similar device for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

The term logic may include, by way of example, software or hardware and/or combinations of software and hardware.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for handling a session in a packet based network, the method comprising:
   setting a minimum jitter delay value and a maximum jitter delay value for the session;
   inserting a plurality of packets into a jitter buffer based on a pre-defined criterion, wherein the pre-defined criterion comprises a network delay condition, the network delay condition comprising:
   the sum of a timestamp of the plurality of packets representing a voice event and the size of at least one frame being greater than a first desired timestamp value; and
   the sum of a timestamp of the plurality of packets representing a DTMF event and the duration of the packet being greater than a second desired timestamp value; and
   playing out the plurality of packets based on the minimum jitter delay value and the maximum jitter delay value.

2. The method according to claim 1, wherein the session comprises an event selected from a group consisting of a Dual-Tone Multi-Frequency (DTMF) event and a voice event.

3. The method according to claim 1 further comprising:
   holding the plurality of packets for the minimum jitter delay value, wherein the minimum jitter delay value is greater than the time taken to detect the end of a DTMF event; and
   updating statistics for the session.

4. The method according to claim 1, the network delay condition comprising a prefill condition.

5. The method according to claim 1, wherein playing out the plurality of packets comprises sending an indication selected from a group consisting of a bad packet indication and a silence period indication if a request for the plurality of packets is received and the plurality of packets do not meet the minimum jitter delay value.

6. The method according to claim 1, wherein playing out the plurality of packets comprises sending an indication selected from a group consisting of a bad packet indication and a silence period indication if the jitter buffer is empty.

7. The method according to claim 1 further comprising sending two or more packets representing a DTMF event, the sending performed in a time period during which termination of the DTMF event is detected, wherein the two or more packets have substantially identical duration.

8. The method according to claim 1, wherein the maximum jitter delay value for the session is based on a network delay.

9. A computer program product for use with a computer, the computer program product comprising a computer usable medium having a computer readable program code embodied therein for handling a session in a packet based network, the computer readable program code performing:
   setting a minimum jitter delay value and a maximum jitter delay value for the session;
   inserting a plurality of packets into a jitter buffer based on a pre-defined criterion, wherein the pre-defined criterion comprises a network delay condition, the network delay condition comprising:
   the sum of a timestamp of the plurality of packets representing a voice event and the size of at least one frame being greater than a first desired timestamp value; and
   the sum of a timestamp of the plurality of packets representing a DTMF event and the duration of the packet being greater than a second desired timestamp value; and
   playing out the plurality of packets based on the minimum jitter delay value and the maximum jitter delay value.

10. The computer program product according to claim 9, wherein the session comprises an event selected from a group consisting of a DTMF event and a voice event.

11. The computer program product according to claim 9, wherein the computer readable program code further performing:
    holding the plurality of packets for the minimum jitter delay value, the minimum jitter delay value is greater than the time taken to detect the end of a DTMF event; and
    updating statistics for the session.

12. The computer program product according to claim 9, the network delay condition comprising a prefill condition.

13. The computer program product according to claim 9, wherein the computer readable program code performing playing out the plurality of packets, the computer readable program code further performs sending an indication selected from a group consisting of a bad packet indication and a silence period indication if a request for the plurality of packets is received and the plurality of packets do not meet the minimum jitter delay value.

14. The computer program product according to claim 9, wherein the computer readable program code performing playing out the plurality of packets, the computer readable program code further performs sending an indication selected from a group consisting of a bad packet indication and a silence period indication if the jitter buffer is empty.

15. The computer program product according to claim 9, wherein the computer readable program code further performing sending two or more packets representing a DTMF event, the sending performed in a time period during which termination of the DTMF event is detected, wherein the plurality of packets having substantially identical duration.

16. The computer program product according to claim 9, wherein the maximum jitter delay value is set based on a network delay.

17. A method for handling a session in a packet based network, the method comprising:
    setting a minimum jitter delay value and a maximum jitter delay value for the session;
    inserting a plurality of packets into a jitter buffer based on a pre-defined criterion, wherein the pre-defined criterion comprises a network delay condition, the network delay condition comprising:
    the sum of a timestamp of the plurality of packets representing a voice event and the size of at least one frame being greater than a first desired timestamp value; and the sum of a timestamp of the plurality of packets representing a DTMF event and the duration of the packet being greater than a second desired timestamp value; and playing out the plurality of packets based on the minimum jitter delay value and the maximum jitter delay value, wherein the first desired timestamp value and the second desired timestamp value are updated for each of the plurality of packets.

18. A computer program product for use with a computer, the computer program product comprising a computer usable medium having a computer readable program code embodied therein for handling a session in a packet based network, the computer readable program code performing:

setting a minimum jitter delay value and a maximum jitter delay value for the session;

inserting a plurality of packets into a jitter buffer based on a pre-defined criterion, wherein the pre-defined criterion comprises a network delay condition, the network delay condition comprising:

the sum of a timestamp of the plurality of packets representing a voice event and the size of at least one frame being greater than a first desired timestamp value; and the sum of a timestamp of the plurality of packets representing a DTMF event and the duration of the packet being greater than a second desired timestamp value; and playing out the plurality of packets based on the minimum jitter delay value and the maximum jitter delay value, wherein the first desired timestamp value and the second desired timestamp value are updated for each of the plurality of packets.

* * * * *